March 23, 1926.  1,577,826
H. L. JACOBSON
HATRACK FOR AUTOMOBILES
Filed April 10, 1924
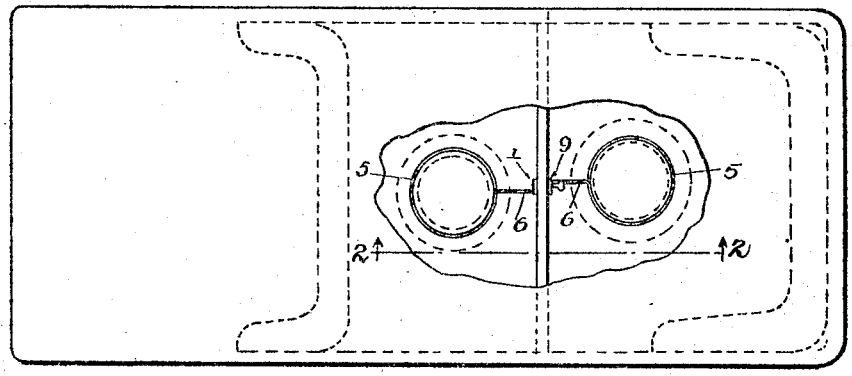
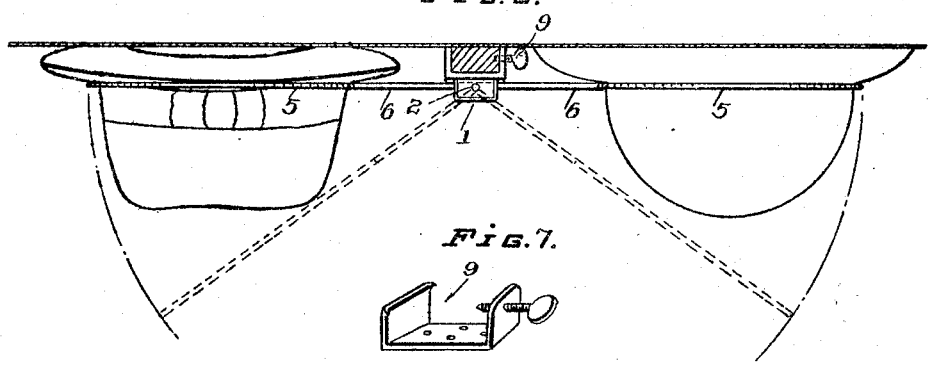
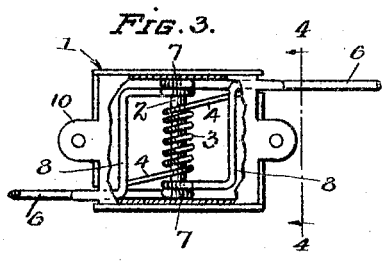
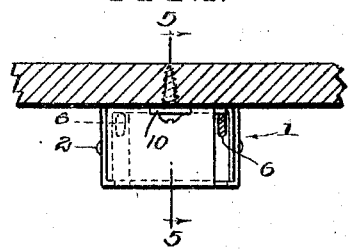
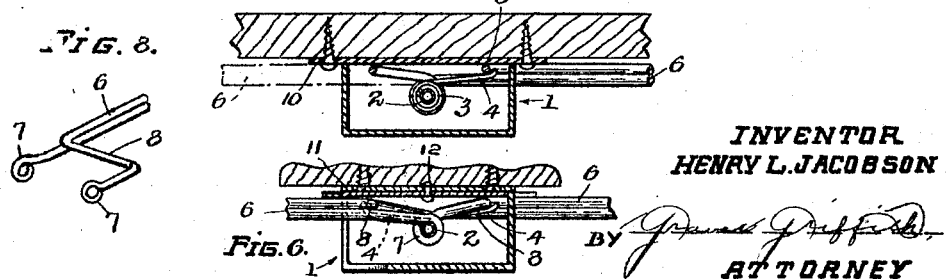
INVENTOR
HENRY L. JACOBSON
BY
ATTORNEY Patented Mar. 23, 1926.

1,577,826

UNITED STATES PATENT OFFICE.

HENRY L. JACOBSON, OF SAN FRANCISCO, CALIFORNIA.

HATRACK FOR AUTOMOBILES.

Application filed April 10, 1924. Serial No. 705,525.

*To all whom it may concern:*

Be it known that I, HENRY L. JACOBSON, a citizen of the United States, and a resident of the city and county of San Francisco and State of California, have invented certain new and useful Improvements in Hatracks for Automobiles, of which the following is a specification.

The present invention relates to improvements in hat-racks for use in automobiles, and diverse other directions, and has for its principal object the provision of a device to which ladies, seeking comfort while automobiling, may transfer their hats as a precautionary measure against rough usage.

In the accompanying drawings, forming a part of this specification and in which similar characters of reference refer to like parts, throughout—

Figure 1 is a top plan of an automobile top, showing the invention secured to a bow thereof.

Figure 2 is a vertical longitudinal section on line 2—2 of Figure 1;

Figure 3 is a top plan view of the device, showing the frame of the device, the means borne thereby for its securement to an automobile top, together with the pin carrying the bearings of the hat-retaining members' arms and the coiled spring controlling their action;

Figure 4 is a vertical section on line 4—4 of Figure 3;

Figure 5 is a vertical section on line 5—5 of Figure 4;

Figure 6 is a detail, showing the casing of the device pivotally secured to a plate, which, in turn, is attached to a top bow of an automobile.

Figure 7 is a detail, perspective, of a clamping means for securing the casing of the device to the top of certain makes of automobiles; and Figure 8 is a perspective view of the bearing-end of a coiled spring and of an arm bearing a hat-retaining member.

The manner of attachment of the device, as is obvious, is dependent upon the type of car and largely a matter of choice. In Figures 1 and 2, the casing bearing the various parts is shown as being fitted for direct attachment thereto; while in Figure 8 this casing is shown as being pivotally secured to a plate provided with means of attachment to the top bow, or otherwise, as may be desired.

Referring more particularly to the drawings, 1 represents the casing bearing the different elements constituting the device, 2 the pin borne thereby and carrying a coiled spring 3 having extensions 4 and supporting the bearings 7 of the arms 6 carrying the hat-retaining members 5 and provided with offset extensions 8 in co-action with the extensions 4, the arms 6 adapted to move in guide-slots in the ends of the casing 9 a clamp adapted for use, when desired, with the casing 1 as an adjunct in securing it to the bow of an automobile top, Figure 3, 10 means permitting the direct attachment of the casing 1 to the bow of the automobile top or, where it is desired to use the clamp for this purpose, to the clamp direct by means of bolts and afterward securing the clamp to the bow as indicated in Figures 1 and 2, and 11 a plate secured to the bow and having pivotally connected thereto the casing 1, as at 12, Figure 6.

Assuming the device to have been secured to an automobile top in the manner described, as a preliminary to its receiving a hat, the hat-retaining member 5 is drawn down, the hat placed in position therein and the member 5 released, the spring 3 acting to return to its normal position, together with the hat.

Having thus described my invention, I claim, and desire to secure by Letters Patent:

A hat rack comprising a rectangular casing member carrying a spring supporting pin adapted to maintain a coiled spring having oppositely disposed free ends, oppositely disposed arms having offset extensions rotatively supported by said spring supporting pin, slots in said casing member forming guideways for said arms, hat supporting loops borne by said arms and oppositely disposed with relation to each other, said spring ends being adapted to be engaged by the said oppositely disposed offset extensions, wherethrough spring action is exerted upon said arms to maintain hats, or other articles, in said supporting loops.

HENRY L. JACOBSON.